(12) United States Patent
Sang

(10) Patent No.: US 10,033,745 B2
(45) Date of Patent: Jul. 24, 2018

(54) METHOD AND SYSTEM FOR VIRTUAL SECURITY ISOLATION

(71) Applicant: Sangfor Technologies Company Limited, Shenzhen (CN)

(72) Inventor: Min Sang, Shenzhen (CN)

(73) Assignee: SANGFOR TECHNOLOGIES INC., Shenzhen (CN)

( * ) Notice: Subject to any disclaimer, the term of this patent is extended or adjusted under 35 U.S.C. 154(b) by 55 days.

(21) Appl. No.: 14/993,986

(22) Filed: Jan. 12, 2016

(65) Prior Publication Data

US 2016/0205116 A1 Jul. 14, 2016

(30) Foreign Application Priority Data

Jan. 13, 2015 (CN) .......................... 2015-1-0016593

(51) Int. Cl.
| | |
|---|---|
| *G06F 12/14* | (2006.01) |
| *G06F 12/16* | (2006.01) |
| *H04L 29/06* | (2006.01) |
| *G06F 21/53* | (2013.01) |
| *G06F 21/57* | (2013.01) |
| *G06F 21/34* | (2013.01) |
| *G06F 21/55* | (2013.01) |
| *G06F 9/455* | (2018.01) |

(52) U.S. Cl.
CPC ...... *H04L 63/1408* (2013.01); *G06F 9/45558* (2013.01); *G06F 21/34* (2013.01); *G06F 21/53* (2013.01); *G06F 21/554* (2013.01); *G06F 21/577* (2013.01); *H04L 63/101* (2013.01); *H04L 63/1416* (2013.01); *G06F 2009/45587* (2013.01); *G06F 2009/45591* (2013.01); *G06F 2009/45595* (2013.01); *G06F 2221/033* (2013.01); *G06F 2221/2149* (2013.01)

(58) Field of Classification Search
None
See application file for complete search history.

(56) References Cited

U.S. PATENT DOCUMENTS

2011/0225624 A1* 9/2011 Sawhney ................ G06F 21/53
726/1
2012/0255004 A1* 10/2012 Sallam .................. G06F 21/554
726/23

(Continued)

*Primary Examiner* — Fatoumata Traore
(74) *Attorney, Agent, or Firm* — Anova Law Group, PLLC

(57) ABSTRACT

A virtual security isolation method includes monitoring security status information of a plurality of virtual machines in a virtual LAN; determining whether the security status information has abnormity; and generating security risk information corresponding to the virtual machine when it is determined that the security status information of a virtual machine has abnormity. The method also includes processing the security risk information according to a preset security risk treatment method having a corresponding relationship with the security risk information, generating ACL setting information for isolating the virtual machine; and sending an isolation command carrying the ACL setting information to an access control list module corresponding to the virtual LAN. The access control list module executes the isolation command and reconfigures the access control list according to the ACL setting information.

15 Claims, 6 Drawing Sheets

(56) References Cited

U.S. PATENT DOCUMENTS

| | | | | |
|---|---|---|---|---|
| 2013/0291109 A1* | 10/2013 | Staniford | ............ | H04L 63/1416 726/23 |
| 2013/0298230 A1* | 11/2013 | Kumar | .................... | G06F 21/52 726/22 |
| 2016/0036838 A1* | 2/2016 | Jain | ..................... | H04L 63/1416 726/23 |

* cited by examiner

| | |
|---|---|
| URL: | http://www.xiaochencc.com/act_002.php |
| Detection ratio: | 5 / 52 |
| Analysis date: | 2014-06-03 23:36:48 UTC ( 3 weeks, 4 days ago ) |

Analysis | Additional information | Comments | Votes

| URL Scanner | Result |
|---|---|
| ADMINUSLabs | Malicious site |
| Emsisoft | Malware site |
| Fortinet | Malware site |
| Kaspersky | Malware site |
| Sophos | Malicious site |

FIG. 3

METHOD AND SYSTEM FOR VIRTUAL SECURITY ISOLATION

CROSS-REFERENCES TO RELATED APPLICATIONS

This application claims priority of Chinese Patent Application No. 201510016593.5, filed on Jan. 13, 2015, the entire contents of which are hereby incorporated by reference.

FIELD OF THE INVENTION

The present disclosure generally relates to the field of computer security technologies and, more particularly, relates to methods and apparatuses for virtual security isolation.

BACKGROUND

Virtualization is one of the hot technologies nowadays. It has been widely used in cloud computing platforms, virtual storages, virtual operating systems, virtual desktops, and virtual terminals. The current virtual security isolation technologies are achieved mainly by dividing different virtual switch (vSwitch) networks, and configuring access control lists (ACLs) on network isolation components provided by virtual software vendors, such as VShield components provided by VMWARE.

As virtual machines have different security levels, and the virtual machines with different security levels may visit each other, there are security risks that virtual machines may attack each other. To eliminate these security risks, traditional virtual security isolation technologies usually divide a vSwitch network into multiple virtual local area networks (virtual LANs, or VLANs). The virtual machines with a same security level are located at a same VLAN, and the security isolation among VLANs is thus achieved.

However, the security isolation among the virtual machines within a VLAN could not be achieved. If a virtual machine in a VLAN has a security risk, the proliferation of the security risk inside the VLAN could not be prevented. For example, in a VLAN with three virtual machines VM1, VM2 and VM3, if the virtual machine VM1 is hacked, the hacker may use the virtual machine VM1 to scan the virtual machines VM2 and VM3. In this case, a traditional virtual security isolation method could not prevent the scanning behavior of the virtual machine VM1.

The disclosed methods and apparatuses are directed to solve one or more problems set forth above and other problems in the art.

BRIEF SUMMARY OF THE DISCLOSURE

One aspect of the present disclosure includes a method for virtual security isolation. The method includes monitoring security status information of a plurality of virtual machines in a virtual LAN; determining whether the security status information has abnormity; and generating security risk information corresponding to the virtual machine when it is determined that the security status information of a virtual machine has abnormity. The method also includes processing the security risk information according to a preset security risk treatment method having a corresponding relationship with the security risk information, generating ACL setting information for isolating the virtual machine; and sending an isolation command carrying the ACL setting information to an access control list module corresponding to the virtual LAN. The access control list module executes the isolation command and reconfigures the access control list according to the ACL setting information.

Another aspect of the present disclosure includes a virtual security isolation system. The system includes a security monitoring module, a security status determining module, a risk information generating module, a setting information generating module, and a security isolation module. The security monitoring module is configured to monitor security status information of a plurality of virtual machines in a virtual LAN. The security status determining module is configured to determine whether the security status information has abnormity. The risk information generating module is configured to, when the security status determining module determines that the safety status information has abnormity, generate security risk information corresponding to the virtual machine. The setting information generating module is configured to process the security risk information according to a preset security risk treatment method having a corresponding relationship with the security risk information, and to generate ACL setting information for isolating the virtual machine. The security isolation module is configured to send an isolation command carrying the ACL setting information to an access control list module corresponding to the virtual LAN, such that the access control list module executes the isolation command and reconfigures the access control list according to the ACL setting information.

Another aspect of the present disclosure includes a non-transitory computer-readable medium having computer program. When being executed by a processor, the computer program performs a method for virtual security isolation. The method includes monitoring security status information of a plurality of virtual machines in a virtual LAN; determining whether the security status information has abnormity; and generating security risk information corresponding to the virtual machine when it is determined that the security status information of a virtual machine has abnormity. The method also includes processing the security risk information according to a preset security risk treatment method having a corresponding relationship with the security risk information, generating ACL setting information for isolating the virtual machine; and sending an isolation command carrying the ACL setting information to an access control list module corresponding to the virtual LAN. The access control list module executes the isolation command and reconfigures the access control list according to the ACL setting information.

Other aspects of the present disclosure can be understood by those skilled in the art in light of the description, the claims, and the drawings of the present disclosure.

BRIEF DESCRIPTION OF THE DRAWINGS

The following drawings are merely examples for illustrative purposes according to various disclosed embodiments and are not intended to limit the scope of the present disclosure.

FIG. 3 illustrates an exemplary interface for checking whether a uniform resource locator is malicious consistent with the disclosed embodiments;

DETAILED DESCRIPTION

To make the objectives, technical solutions and advantages of the present invention more clear and explicit, the present invention is described in further detail with accompanying drawings and embodiments. It should be understood that the specific exemplary embodiments described herein are only for explaining the present invention and are not intended to limit the present invention.

Reference will now be made in detail to exemplary embodiments of the disclosure, which are illustrated in the accompanying drawings. Wherever possible, the same reference numbers will be used throughout the drawings to refer to the same or like parts.

Figure 2A:
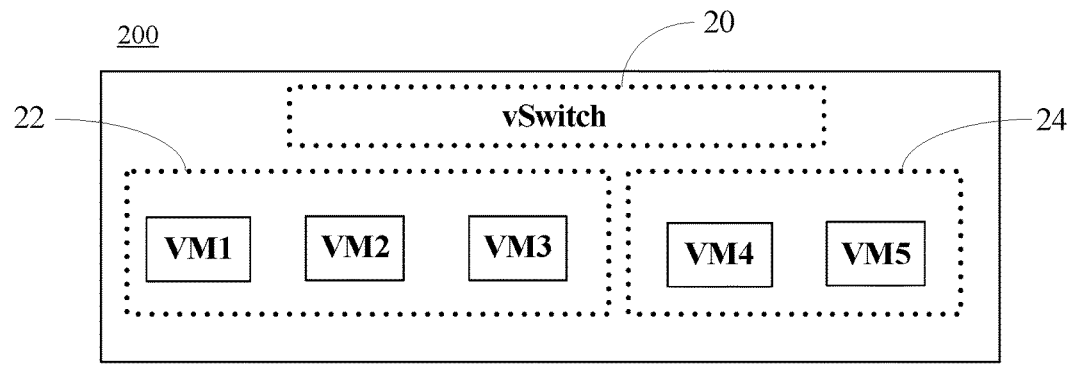
FIG. 2A illustrates an exemplary application environment for virtual security isolation consistent with the disclosed embodiments.

FIG. 2A illustrates an exemplary application environment 200 incorporating various aspects of virtual security isolation consistent with the disclosed embodiments. As shown in FIG. 2A, the exemplary application environment 200 includes a virtual switch 20, and a plurality of virtual machines, e.g., VM1, VM2, VM3, VM4, and VM5. By setting the access control list (ACL) in the virtual switch 20, the virtual machines VM1, VM2, VM3, VM4, and VM5 may be isolated into a virtual LAN 22 and a virtual LAN 24.

For example, the virtual LAN 22 may include the virtual machines VM1, VM2, and VM3, and the virtual LAN 24 may include the virtual machines VM4, and VM5. The virtual machines in the virtual LAN 22 and the virtual machines in the virtual LAN 24 may be unable to communicate with each other directly. However, the virtual machines within a same virtual LAN may communicate with each other. For example, the virtual machines VM1, VM2 and VM3 within the virtual LAN 22 may communicate with each other and, if one of the virtual machines VM1, VM2 and VM3 is infected with a computer virus, other virtual machines in the virtual LAN 22 may also be infected with the computer virus.

Although one virtual switch 20, two virtual LANs 22 and 24, and five virtual machines VM1, VM2, VM3, VM4, and VM5 are shown in the exemplary application environment, an application environment may have any number of virtual switches, any number of virtual LANs, and any number of virtual machines.

Figure 2B:
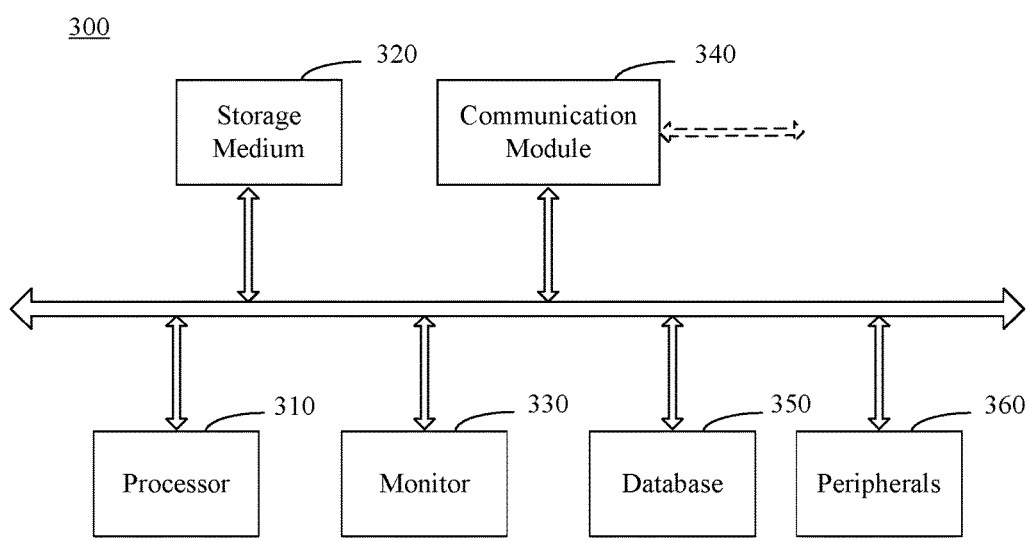
FIG. 2B illustrates an exemplary computing system consistent with the disclosed embodiments.

FIG. 2B illustrates an exemplary computing system 300 that may be used to implement methods and apparatuses for virtual security isolation consistent with the disclosed embodiments (e.g., virtual switch, virtual server, or virtual machine, etc.). As shown in FIG. 2B, the computing system may include a processor 310, a storage medium 320, a monitor 330, a communication module 340, a database 350, and peripherals 360. Certain devices may be omitted and other devices may be included.

Processor 310 may include any appropriate processor or processors. Further, processor 310 can include multiple cores for multi-thread or parallel processing. Storage medium 320 may include memory modules, such as ROM, RAM, flash memory modules, and erasable and rewritable memory, and mass storages, such as CD-ROM, U-disk, and hard disk, etc. Storage medium 320 may store computer programs for implementing various processes, when executed by processor 310.

Further, peripherals 360 may include I/O devices such as keyboard and mouse, and communication module 340 may include network devices for establishing connections through the communication network. Database 350 may include one or more databases for storing certain data and for performing certain operations on the stored data, such as database searching.

Figure 1:
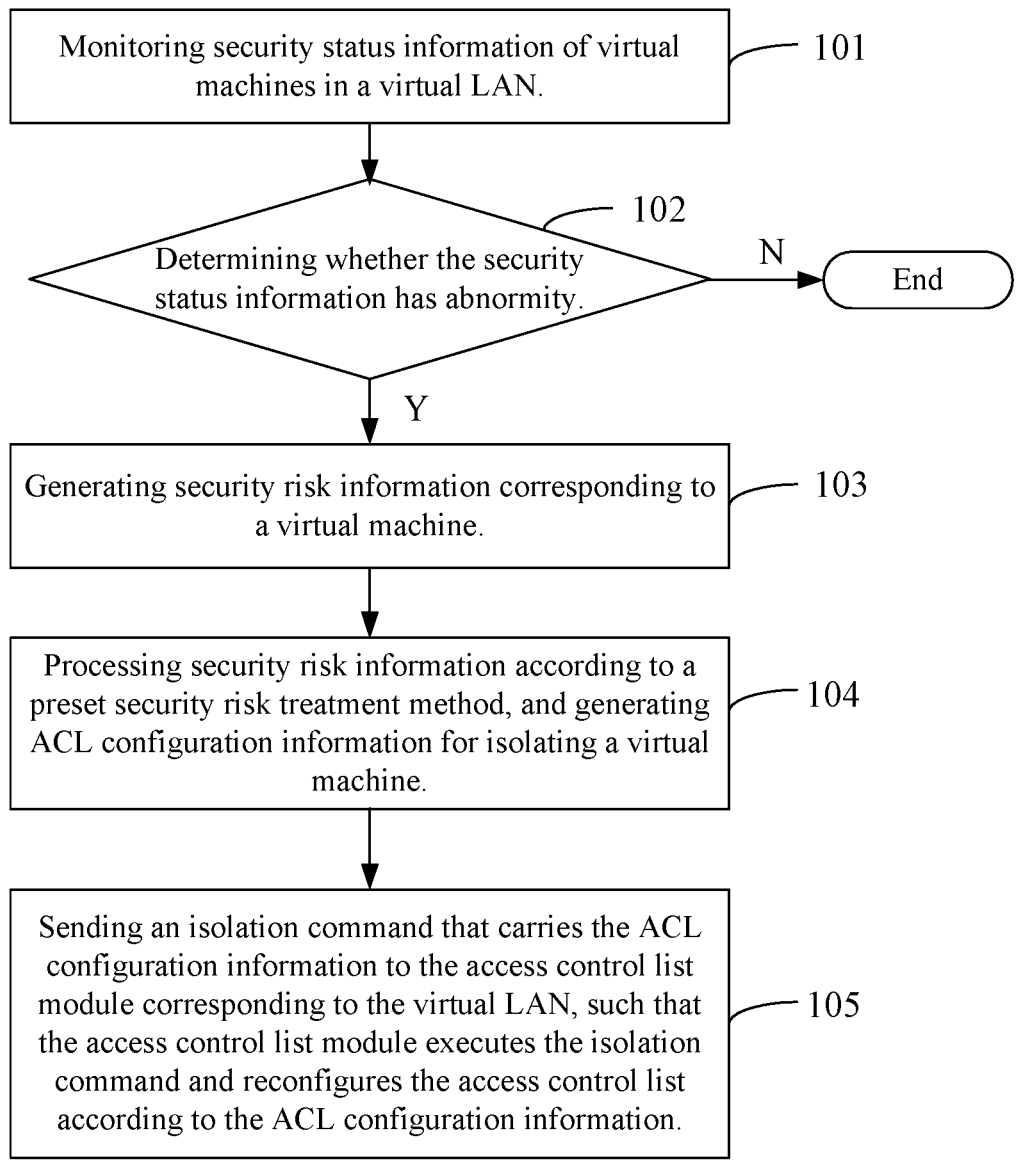
FIG. 1 illustrates a flow chart of an exemplary virtual security isolation method consistent with the disclosed embodiments.

FIG. 1 illustrates an exemplary virtual security isolation method. The virtual security isolation method may be used in the configuration shown in FIG. 2A, the security isolation of virtual machines in a virtual LAN may be achieved by real-time monitoring of the security status information of the virtual machines in the virtual LAN. For example, if the security status information of VM1 has abnormity, access control list (ACL) setting information for isolating VM1 may be generated. An isolation command carrying the ACL setting information is then sent to an access control list module of the virtual switch 20. The access control list module then executes an isolation command, and the security isolation of VM1 is thus achieved.

Specifically, as shown in FIG. 1, the virtual security isolation process may include following steps.

Step 101: monitoring the security status information of the virtual machines in a virtual LAN. The security monitoring on the activity information of virtual machines may be performed by a physical security device or security protection software. The security status information under monitoring includes, but not limited to, data traffic rate or data flow rate, files and other relevant information. The physical security device may include a firewall, a security gateway, or other devices.

Step 102: determining whether the security status information has abnormity. If the security status information has abnormity, the process goes to Step 103. If the security status information does not have any abnormity, the process completes.

In Step 102, determining whether the security status information has abnormity may include: obtaining the data traffic corresponding to a data packet sent or received by a virtual machine; determining whether the data traffic matches preset behavioral characteristics. If the data traffic matches predetermined behavioral characteristics, the security status information of the virtual machine has abnormity.

The security status information of a virtual machine may be the data packet sent or received by the virtual machine. The data packets transmitted during the communication between a virtual machine and another virtual machine in a virtual LAN are monitored; and the data packets transmitted during the communication between a virtual machine in the virtual LAN and an external network are monitored as well. An excessively heavy data traffic under an abnormal circumstance may lead to network congestion, excessively consuming network resources. If the data traffic corresponding to a data packet or a same type data packet (e.g., data packets between same source and destination, or data packets transmitting or receiving by a same virtual machine, or data packets of a particular application protocol, etc.) of a virtual machine exceeds a preset first threshold, the virtual machine may have security risks.

In one embodiment, the preset behavior characteristics may include, but not limited to, data traffic thresholds, and heartbeat behavior characteristics, etc. For example, if a hacker controls a virtual machine to launch outward a DNS flooding attack, a data traffic threshold may be set according to the data traffic corresponding to a DNS data packet under a normal circumstance. If the data traffic exceeds the data traffic threshold, the data package of the virtual machine has abnormity.

In one embodiment, certain security threat information may be added to a security risk identification library in advance. The security threat information may include, but not limited to, threat uniform resource locators (URL) and predetermined sensitive information. For example, the uniform resource locators contained in a data packet are checked through a Trojan-virus killing engine. If a security threat is detected in a site pointed by the uniform resource locator (URL) or if the data packet is detected to be a virus or security threat, the URL is added to the security risk identification library. FIG. 3 illustrates an exemplary interface.

As shown in FIG. 3, "www.xiaochencc.com/act_002.php" is listed as a malicious URL. Analysis may be performed by a URL scanner, and various URL scanners may be used to cross verify the threat URL site. Each URL scanner may report the scanning result and the system may determine whether the URL is to be listed as the malicious URL based on the results from the URL scanners. There are security risks for accessing this URL, so this URL is added to a preset security risk identification library. Further, sensitive information may refer to confidential documents, account passwords and other sensitive information stored in a virtual machine.

Alternatively or additionally, in Step 102, determining whether the security status information has abnormity may include: checking the file contents in a virtual machine; extracting the characteristic information from the file contents that can be used to determine whether the file contents have abnormity; and identifying the characteristic information through a preset security risk identification library. If it is identified that the characteristic information matches the characteristic information in the preset security risk identification library, the security status of the virtual machine has abnormity.

For example, the characteristics information corresponding to the file contents infected by viruses is not consistent with normal characteristics information. If the extracted characteristic information matches the characteristic information stored in a preset security risk identification library, the corresponding virtual machine has security threats.

Alternatively or additionally, in Step 102, determining whether the security status information has abnormity may include: obtaining a resource occupancy rate of a virtual machine; and determining whether the resource occupancy rate exceeds a preset threshold. If the resource occupancy rate exceeds a preset threshold, the security status information of the virtual machine has abnormity.

For example, the resource occupancy of a virtual machine may include: occupancy of CPU, memory, storage or disks and other physical hardware resources, and occupancy of network resources. If the resource occupancy rate exceeds a preset threshold of a virtual machine in a normal operating state, the resource occupancy behavior is abnormal, and the corresponding virtual machine has security threats.

In another embodiment, the data behavioral characteristics of a virtual machine include the operating behaviors of a user of a virtual machine. In Step 102, determining whether the security status information has abnormity may include: obtaining operating behavior information of a user of a virtual machine; and identifying the operating behavior information through a preset security risk identification library. If it is identified that the operating behavior information matches the information in the preset security risk identification library, the security status of the virtual machine has abnormity.

The operating behaviors of a user of a virtual machine may include, but not limited to, the user operating the virtual machine to launch attacks, the user's unauthorized accesses, and the user stealing files and account passwords, etc. The characteristic information of maliciously operating a virtual machine is extracted in advance and stored in a security risk identification library. The characteristic information stored in the security risk identification library is compared with the operating behavior information of a user. If the characteristic information stored in the security risk identification library matches the operating behavior information of a user, the operating behavior of the user to the virtual machine has security threats.

Further, the security risk identifications based on data activities include, but not limited to, identifications based on thresholds, and identifications based on artificial intelligence, such as heuristic scanning.

Step 103: generating security risk information corresponding to a virtual machine. For example, through analysis of the security status information, the source of a security threat as well as the target of the security threat may be determined. Based on the source of the security threat, the abnormal virtual machine in a virtual local area network can be identified.

In one embodiment, in Step 103, determining a virtual machine with abnormity based on the security status information and generating security risk information corresponding to the virtual machine may include: obtaining the source IP address and the source port initiating access requests to a uniform resource locator (e.g., a risky uniform resource locator), and the destination IP address and destination port carried by the uniform resource locator; determining an abnormal virtual machine based on the source IP address and source port; and generating the security risk information corresponding to the virtual machine according to the source IP address, source port, destination IP address and destination port.

Step 104: processing the security risk information according to a preset security risk treatment method, and generating ACL setting information for isolating the corresponding virtual machine.

The preset security risk treatment methods have corresponding relationships with the security risk information, and a user may configure security risk treatment methods according to specific needs. The ACL setting information may include the setting information of IP address and/or IP address range, source port and destination port and/or the range thereof. Setting an ACL according to the ACL setting information may isolate a virtual machine from other virtual machines in a virtual LAN, and may also isolate a virtual machine from an external network. For example, the security risk information is the access to an external malicious URL by a virtual machine, and the ACL setting information is to prevent the communication between the virtual machine and the destination IP address of the malicious URL.

Step 105: sending an isolation command that carries ACL setting information to an access control list module corresponding to the virtual LAN, such that the access control list module executes the isolation command and sets the access control list according to the ACL setting information.

An access control list module is a function module installed on a virtual switch for managing access control lists. After executing an isolation command, the access control list module reconfigures the ACL of a virtual machine for the purpose of isolating the virtual machine. Isolating a virtual machine includes, but not limited to, blocking all the access requests initiated by the virtual machine, and blocking the communication between the virtual machine and other virtual machines in the virtual LAN.

Thus, according to the virtual security isolation method described above, through the reconfiguring of the ACL corresponding to a virtual LAN, logical isolation to a virtual machine with abnormity in the virtual LAN may be performed. Because an isolated virtual machine cannot communicate with other virtual machines in the virtual LAN, security risks are locked within the abnormal virtual machine, and cannot spread over the virtual LAN. Therefore, the security isolation between virtual machines in a virtual LAN is realized, and the network security is improved.

Figure 4:
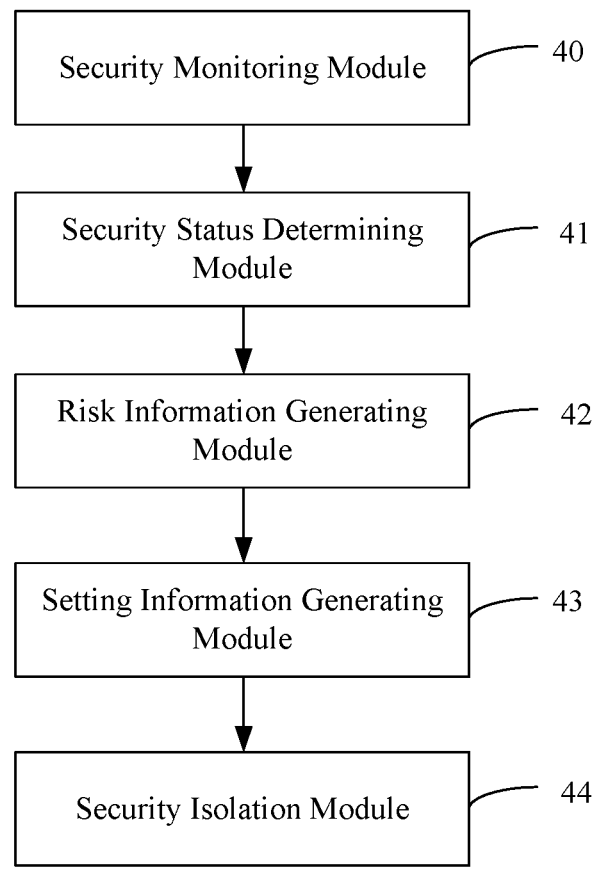
FIG. 4 illustrates a block diagram of an exemplary virtual security isolation apparatus consistent with the disclosed embodiments.

FIG. 4 illustrates an exemplary virtual security isolation system. As shown in FIG. 4, the virtual security isolation system may include a security monitoring module 40, a security status determining module 41, a risk information generating module 42, a setting information generating module 43, and a security isolation module 44.

The security monitoring module 40 may be configured to monitor the security status information of a virtual machine in a virtual LAN. The security status determining module 41 may be configured to determine whether the security status information has abnormity.

The risk information generating module 42 may be configured to, if the security status determining module 41 determines that the security status information has abnormity, generate the corresponding security risk information of the virtual machine.

The setting information generating module 43 may be configured to process the security risk information based on a preset security risk treatment method, and generate ACL setting information for isolating the virtual machine.

The security isolation module 44 may be configured to send an isolation command carrying ACL setting information to the access control list module corresponding to the virtual LAN, such that the access control list module executes the isolation command, and sets or reconfigures the access control list according to the ACL setting information.

Figure 5:
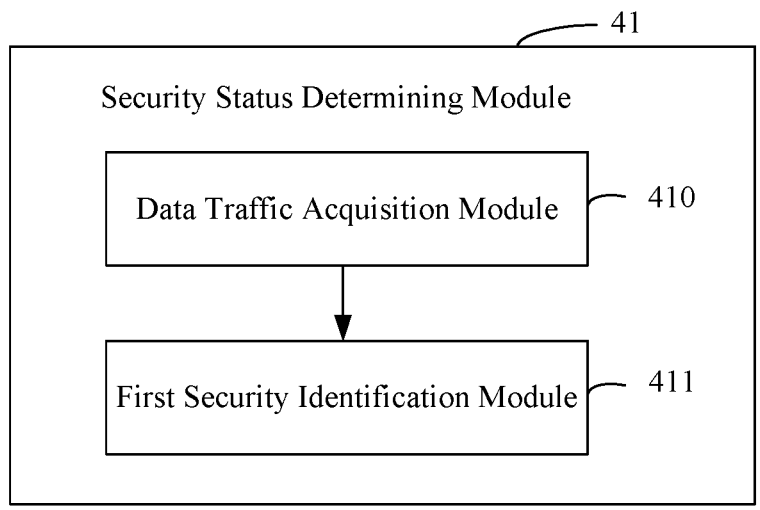
FIG. 5 illustrates a block diagram of an exemplary security status determining module consistent with the disclosed embodiments.

Further, as shown in FIG. 5, when the security status information of a virtual machine is about data packets sent or received by a virtual machine. The security status determining module 41 may include a data traffic acquisition module 410 and a first security identification module 411.

The data traffic acquisition module 410 may be configured to obtain the data traffic rate corresponding to data packets sent to or received by a virtual machine. The first security identification module 411 may be configured to determine whether the data traffic matches a preset behavior characteristic. If the data traffic matches a preset behavior characteristic, the security status information of the virtual machine has abnormity.

Figure 6:
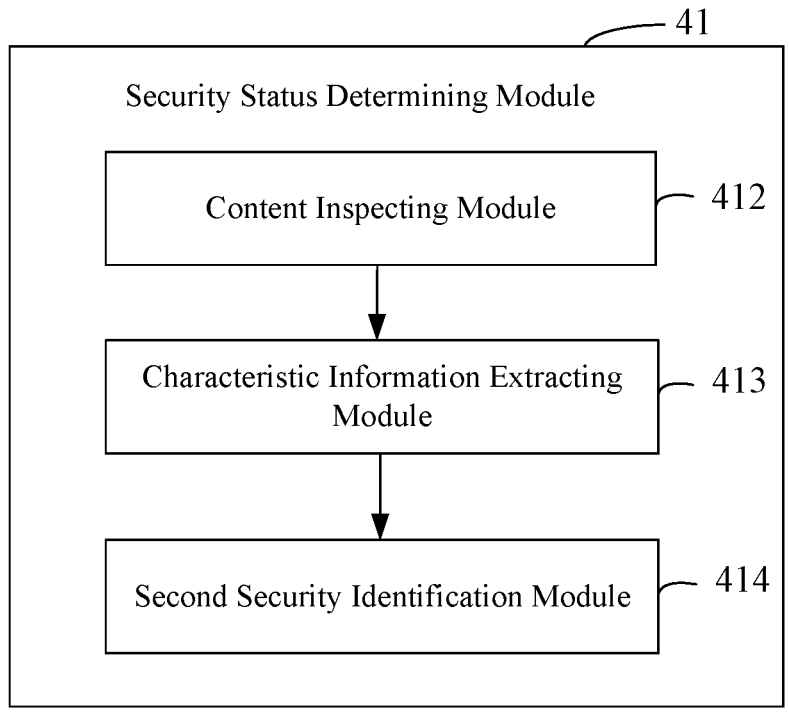
FIG. 6 illustrates a block diagram of another exemplary security status determining module consistent with the disclosed embodiments.

Further, as shown in FIG. 6, the security status determining module 41 may include a content inspecting module 412, a characteristic information extracting module 413, and a second security identification module 414.

The content inspecting module 412 may be configured to inspect the file contents in a virtual machine. The characteristic extracting module 413 may be configured to extract the characteristic information in the file contents that can be used to determine whether the file contents have abnormity.

The second security identification module 414 may be configured to identify the characteristic information through a preset security risk identification library. If it is identified that the characteristic information matches the characteristic information in the preset security risk identification library, the security status information of the virtual machine has abnormity.

Figure 7:
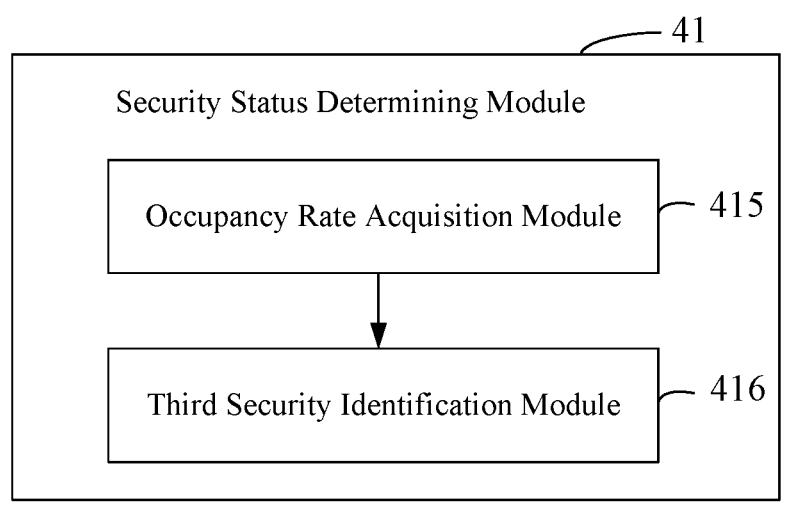
FIG. 7 illustrates a block diagram of another exemplary security status determining module consistent with the disclosed embodiments.

Further, as shown in FIG. 7, when the security status information of a virtual machine is the data behavior of the virtual machine and the data behavior of a virtual machine is the resource occupancy of a virtual machine, the security status determining module 41 may include an occupancy rate acquisition module 415 and a third security identification module 416.

The occupancy rate acquisition module 415 may be configured to acquire the resource occupancy rate of a virtual machine. The third security identification module 416 may be configured to determine whether a resource occupancy rate exceeds a preset threshold. If the resource occupancy rate exceeds the preset threshold, the security status information of the virtual machine has abnormity.

Figure 8:
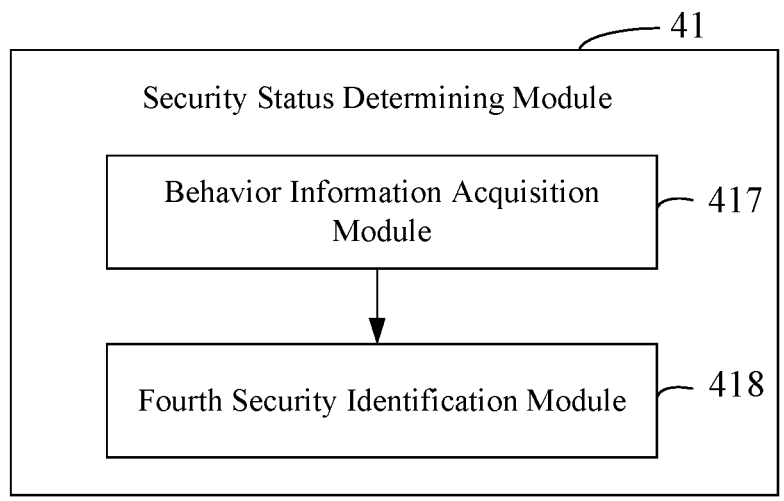
FIG. 8 illustrates a block diagram of another exemplary security status determining module consistent with the disclosed embodiments.

Further, as shown in FIG. 8, when the data behavior of a virtual machine is the operating behavior of a user to the virtual machine, the security status determining module 41 may include a behavior information acquisition module 417 and a fourth security identification module 418.

The behavior information acquisition module 417 may be configured to acquire the operating behavior information of a user to a virtual machine. The fourth security identification module 418 may be configured to identify operating behavior information based on a preset security risk identification library. If it is identified that the operation behavioral information matches the information in a preset security risk identification library, the security status information of the virtual machine has abnormity.

Figure 9:
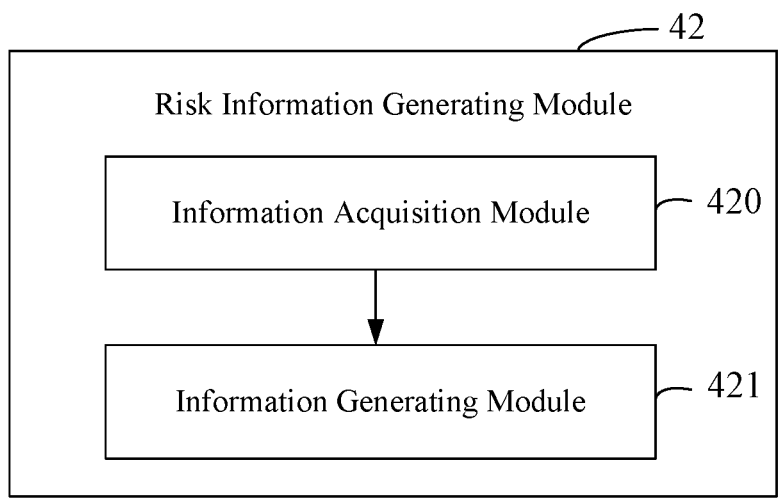
FIG. 9 illustrates a block diagram of an exemplary risk information generating module consistent with the disclosed embodiments.

Further, as shown in FIG. 9, the risk information generating module 42 may include an information acquisition module 420 and an information generating module 421. The information acquisition module 420 may be configured to acquire the source IP address and the source port initiating access requests to a uniform resource locator, and the destination IP address and the destination port carried by the uniform resource locator.

The information generating module 421 may be configured to identify an abnormal virtual machine through its related source IP address and source port, and generate security risk information corresponding to the virtual machine according to its related source IP address, source port, destination IP address and destination port.

By using the disclosed system and methods, through reconfiguring the access control list corresponding to the virtual LAN, abnormal virtual machines within the virtual LAN can be logically isolated, such that the abnormal virtual machine cannot communicate with other virtual machines within the virtual LAN. Thus, the security risk is locked within the abnormal virtual machine and cannot be spread in the virtual LAN. Security isolation of the virtual machines within the virtual LAN can be realized and the network security can be improved.

The embodiments disclosed herein are exemplary only and not limiting the scope of this disclosure. Various alternations, modifications, or equivalents to the technical solutions of the disclosed embodiments can be obvious to those skilled in the art and can be included in this disclosure. Without departing from the spirit and scope of this invention, such other modifications, equivalents, or improvements to the disclosed embodiments are intended to be encompassed within the scope of the present disclosure.

What is claimed is:

1. A virtual security isolation method, comprising:
   monitoring security status information of a plurality of virtual machines in a virtual local area networks (LAN);
   determining whether the security status information has abnormity, wherein determining whether the security status information has abnormity further includes:
   obtaining a resource occupancy rate of the virtual machine; and
   determining whether the resource occupancy rate exceeds a preset threshold, wherein if the resource occupancy rate exceeds a preset threshold, the security status information of the virtual machine has abnormity;
   when it is determined that the security status information of a virtual machine has abnormity, generating security risk information corresponding to the virtual machine;
   processing the security risk information according to a preset security risk treatment method having a corresponding relationship with the security risk information, and generating access control list (ACL) setting information for isolating the virtual machine, the ACL setting information including setting information that prevents communication of the virtual machine based on the security risk information corresponding to the virtual machine; and
   sending an isolation command carrying the ACL setting information to an access control list module corresponding to the virtual LAN, such that the access control list module executes the isolation command and reconfigures the access control list according to the ACL setting information.

2. The virtual security isolation method according to claim 1, wherein
   determining whether the security status information has abnormity further includes:
   obtaining data traffic corresponding to data packets sent to or received by the virtual machine; and
   determining whether the data traffic matches preset behavioral characteristics and that the security status information of the virtual machine has abnormity when the data traffic matches predetermined behavioral characteristics.

3. The virtual security isolation method according to claim 1, wherein
   determining whether the security status information has abnormity further includes:
   checking file contents in the virtual machine;
   extracting characteristic information from the file contents used to determine whether the file contents have abnormity; and
   identifying the characteristic information through a preset security risk identification library, and determining that the security status information of the virtual machine has abnormity when the characteristic information matches information in the preset security risk identification library.

4. The virtual security isolation method according to claim 1, wherein
   determining whether the security status information has abnormity further includes:
   obtaining operating behavior information of a user on a virtual machine; and
   identifying the operating behavior information through a preset security risk identification library, and determining that the security status information of the virtual machine has abnormity when the operating behavior information matches information in the preset security risk identification library.

5. The virtual security isolation method according to claim 1, wherein
   generating security risk information corresponding to the virtual machine further includes:
   obtaining a source IP address and a source port initiating access requests to a risky uniform resource locator, and a destination IP address and a destination port carried by the risky uniform resource locator;
   determining the virtual machine based on the source IP address and the source port; and
   generating the security risk information corresponding to the virtual machine according to the source IP address, the source port, the destination IP address, and the destination port.

6. A virtual security isolation system, comprising
   a memory storing instructions: and
   a processor coupled to the memory and, when executing the instructions, configured to:
   monitor security status information of a plurality of virtual machines in a virtual local area networks (LAN);
   determine whether the security status information has abnormity, wherein the processor is further configured to:
   acquire a resource occupancy rate of the virtual machine; and
   determine whether the resource occupancy rate exceeds a preset threshold, wherein if the resource occupancy rate exceeds a preset threshold, the security status information of the virtual machine has abnormity;
   when the safety status information has abnormity, generate security risk information corresponding to the virtual machine;
   process the security risk information according to a preset security risk treatment method having a corresponding relationship with the security risk information, and generate access control list (ACL) setting information for isolating the virtual machine, the ACL setting information including setting information that prevents communication of the virtual machine based on the security risk information corresponding to the virtual machine; and
   send an isolation command carrying the ACL setting information to an access control list module corresponding to the virtual LAN, such that the access control list module executes the isolation command and reconfigures the access control list according to the ACL setting information.

7. The virtual security isolation system according to claim 6,
wherein the processor is further configured to:
obtain data traffic corresponding to data packets sent to or received by the virtual machine; and
determine whether the data traffic matches preset behavioral characteristics and that the security status information of the virtual machine has abnormity when the data traffic matches predetermined behavioral characteristics.

8. The virtual security isolation system according to claim 6,
wherein the processor is further configured to:
inspect file contents in the virtual machine;
extract the characteristic information from the file contents used to determine whether the file contents have abnormity; and
identify the characteristic information through a preset security risk identification library, and determine that the security status information of the virtual machine has abnormity when the characteristic information matches information in the preset security risk identification library.

9. The virtual security isolation system according to claim 6,
wherein the processor is further configured to:
acquire operating behavior information of a user on a virtual machine; and
identify the operating behavior information through a preset security risk identification library, and determine that the security status information of the virtual machine has abnormity when the operating behavior information matches information in the preset security risk identification library.

10. The virtual security isolation system according to claim 6,
wherein the processor is further configured to:
acquire a source IP address and a source port initiating access requests to a risky uniform resource locator, and a destination IP address and a destination port carried by the risky uniform resource locator; and
identify the virtual machine through its related source IP address and source port, and generate security risk information corresponding to the virtual machine according to its related source IP address, source port, destination IP address, and destination port.

11. A non-transitory computer-readable medium having computer program for, when being executed by a processor, performing a method for virtual security isolation, the method comprising:
monitoring security status information of a plurality of virtual machines in a virtual local area networks (LAN);
determining whether the security status information has abnormity, wherein determining whether the security status information has abnormity further includes:
obtaining a resource occupancy rate of the virtual machine; and
determining whether the resource occupancy rate exceeds a preset threshold, wherein if the resource occupancy rate exceeds a preset threshold, the security status information of the virtual machine has abnormity;
when it is determined that the security status information of a virtual machine has abnormity, generating security risk information corresponding to the virtual machine;
processing the security risk information according to a preset security risk treatment method having a corresponding relationship with the security risk information, and generating access control list (ACL) setting information for isolating the virtual machine, the ACL setting information including setting information that prevents communication of the virtual machine based on the security risk information corresponding to the virtual machine; and
sending an isolation command carrying the ACL setting information to an access control list module corresponding to the virtual LAN, such that the access control list module executes the isolation command and reconfigures the access control list according to the ACL setting information.

12. The non-transitory computer-readable medium according to claim 11,
wherein determining whether the security status information has abnormity further includes:
obtaining data traffic corresponding to data packets sent to or received by the virtual machine; and
determining whether the data traffic matches preset behavioral characteristics and that the security status information of the virtual machine has abnormity when the data traffic matches predetermined behavioral characteristics.

13. The non-transitory computer-readable medium according to claim 11,
wherein determining whether the security status information has abnormity further includes:
checking file contents in the virtual machine;
extracting characteristic information from the file contents used to determine whether the file contents have abnormity; and
identifying the characteristic information through a preset security risk identification library, and determining that the security status information of the virtual machine has abnormity when the characteristic information matches information in the preset security risk identification library.

14. The non-transitory computer-readable medium according to claim 11,
wherein determining whether the security status information has abnormity further includes:
obtaining operating behavior information of a user on a virtual machine; and
identifying the operating behavior information through a preset security risk identification library, and determining that the security status information of the virtual machine has abnormity when the operating behavior information matches information in the preset security risk identification library.

15. The non-transitory computer-readable medium according to claim 11,
wherein generating security risk information corresponding to the virtual machine further includes:
obtaining a source IP address and a source port initiating access requests to a risky uniform resource locator, and a destination IP address and a destination port carried by the risky uniform resource locator;
determining the virtual machine based on the source IP address and the source port; and
generating the security risk information corresponding to the virtual machine according to the source IP address, the source port, the destination IP address, and the destination port.

* * * * *